(12) United States Patent
Ondrasik

(10) Patent No.: US 7,673,886 B2
(45) Date of Patent: Mar. 9, 2010

(54) SHOPPING CART

(76) Inventor: V. John Ondrasik, 6150 Sheila St., Commerce, CA (US) 90040

( * ) Notice: Subject to any disclaimer, the term of this patent is extended or adjusted under 35 U.S.C. 154(b) by 0 days.

(21) Appl. No.: 12/168,729

(22) Filed: Jul. 7, 2008

(65) Prior Publication Data

US 2008/0265534 A1    Oct. 30, 2008

Related U.S. Application Data

(63) Continuation of application No. 11/506,067, filed on Aug. 16, 2006, now Pat. No. 7,396,025, which is a continuation of application No. 10/836,169, filed on Apr. 30, 2004, now Pat. No. 7,168,711, which is a continuation-in-part of application No. 10/401,341, filed on Mar. 26, 2003, now Pat. No. 6,926,291.

(51) Int. Cl.
*B62D 39/00* (2006.01)
(52) U.S. Cl. ............................. 280/33.991; 280/33.992; 280/33.993; 280/33.997; 280/47.34; 280/DIG. 4
(58) Field of Classification Search ............ 280/33.991, 280/33.992, 33.993, 33.997, 47.34, DIG. 4
See application file for complete search history.

(56) References Cited

U.S. PATENT DOCUMENTS

| | | | |
|---|---|---|---|
| 2,443,236 A | 6/1948 | Gallagher | |
| 2,479,530 A | 8/1949 | Watson | |
| 2,837,344 A | 6/1958 | Young | |
| 2,890,057 A | 6/1959 | Davis | |
| 2,901,262 A | 8/1959 | Berlin | |
| 2,998,978 A | 9/1961 | Sides | |
| 3,015,494 A * | 1/1962 | Fosbrook, Sr. | 280/33.991 |
| 3,375,018 A | 3/1968 | Close | |
| 3,402,497 A | 9/1968 | Swain | |
| 3,645,554 A | 2/1972 | Von Stein et al. | |
| 3,770,382 A | 11/1973 | Carter et al. | |
| 3,909,034 A | 9/1975 | Trubiano | |
| 4,381,870 A | 5/1983 | Muellner | |
| 4,423,882 A | 1/1984 | Stover et al. | |
| 4,519,622 A | 5/1985 | Levy-Joseph | |
| 4,647,055 A * | 3/1987 | Weill | 280/33.992 |
| RE32,453 E | 7/1987 | Stover et al. | |
| 4,678,195 A | 7/1987 | Trubiano | |
| 4,771,840 A | 9/1988 | Keller | |
| 5,149,114 A | 9/1992 | Lewandowski et al. | |
| 5,306,033 A | 4/1994 | Evans | |
| 5,322,306 A | 6/1994 | Coleman | |

(Continued)

*Primary Examiner*—Paul N Dickson
*Assistant Examiner*—Jacob Meyer
(74) *Attorney, Agent, or Firm*—Gordon & Rees LLP

(57) ABSTRACT

A shopping cart has a wheeled base, a rear frame projecting upwardly from the rear end of the base with a handle at its upper end, a basket having a rear end secured to the frame and projecting forwardly from the frame at spacing above the base, and a fixed child seat secured to the rear frame. The basket is closed by a pivoted rear gate at its rear end. Two or more carts can be nested together by pushing the front wall of the basket of a first cart through the rear frame beneath the fixed child seat of a second cart, simultaneously pivoting the rear gate upwardly to allow the basket of the first cart to enter the basket of the second cart. The side walls are inclined upwardly from the child seat to the front end of the basket.

13 Claims, 10 Drawing Sheets

U.S. PATENT DOCUMENTS

| | | | |
|---|---|---|---|
| 5,366,123 A | 11/1994 | Range | |
| 5,507,507 A | 4/1996 | Davidson | |
| 5,595,394 A | 1/1997 | Adamson | |
| 5,662,342 A | 9/1997 | Basharat | |
| 5,865,449 A | 2/1999 | Castaneda | |
| 6,098,998 A | 8/2000 | Ondrasik | |
| 6,126,181 A | 10/2000 | Ondrasik | |
| 6,422,580 B1 * | 7/2002 | Hunter | 280/33.992 |
| 6,488,292 B2 | 12/2002 | O'Quin | |
| 6,644,674 B2 * | 11/2003 | Simard | 280/33.991 |
| 6,832,767 B1 | 12/2004 | Sandvik et al. | |
| 6,926,291 B1 * | 8/2005 | Ondrasik | 280/33.991 |
| 7,168,711 B2 * | 1/2007 | Ondrasik | 280/33.991 |
| 7,322,582 B2 * | 1/2008 | Prather et al. | 280/33.991 |
| 7,396,025 B2 * | 7/2008 | Ondrasik | 280/33.991 |
| 2002/0135145 A1 * | 9/2002 | Saccani | 280/33.991 |
| 2004/0104549 A1 * | 6/2004 | Bergia | 280/33.991 |
| 2004/0201187 A1 * | 10/2004 | Ondrasik | 280/33.991 |
| 2005/0127623 A1 * | 6/2005 | Sandvik et al. | 280/33.993 |
| 2006/0049590 A1 * | 3/2006 | O'Quin | 280/33.991 |
| 2007/0235961 A1 * | 10/2007 | Clair | 280/33.994 |
| 2009/0058024 A1 * | 3/2009 | Cagan et al. | 280/33.991 |

* cited by examiner

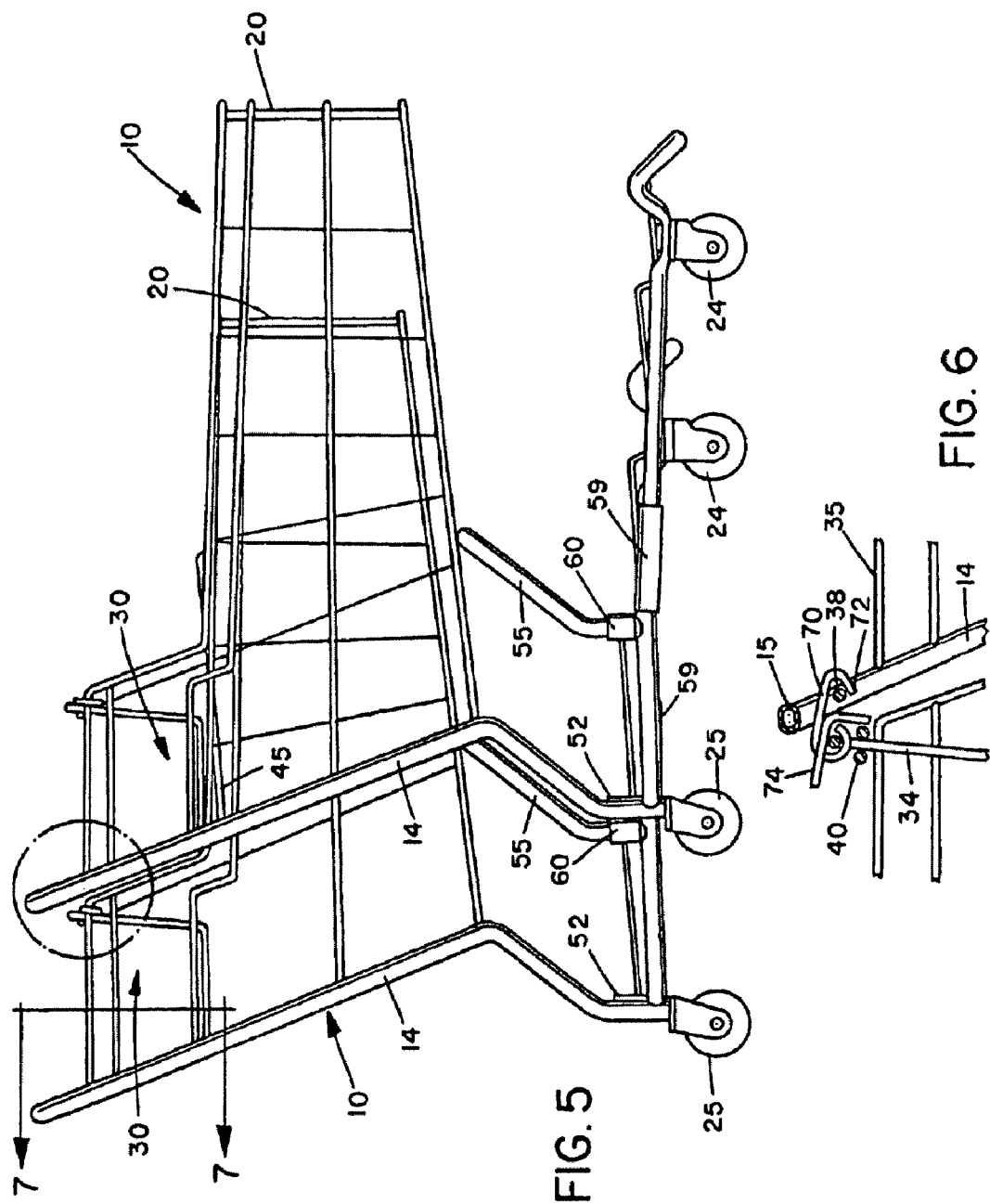

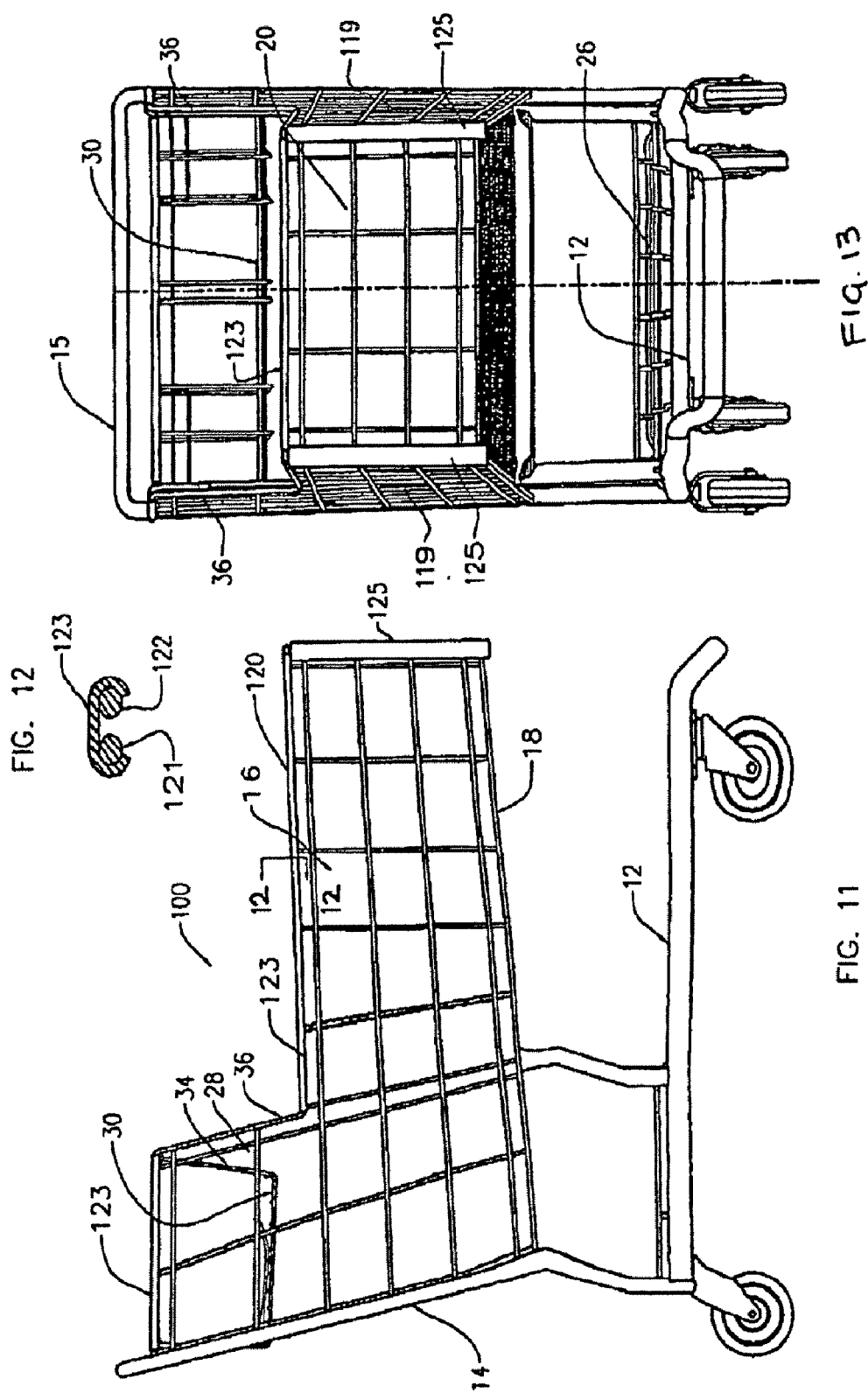

SHOPPING CART

CROSS REFERENCE TO RELATED APPLICATIONS

This application is a Continuation of U.S. patent application Ser. No. 11/506,067 filed Aug. 16, 2006, which is a Continuation of U.S. patent application Ser. No. 10/836,169 filed Apr. 30, 2004, now U.S. Pat. No. 7,168,711, which is a Continuation-In-Part of U.S. patent application Ser. No. 10/401,341 filed Mar. 26, 2003, now U.S. Pat. No. 6,926,291. The entire disclosures and drawings of each of these prior applications are incorporated by reference into this application as if they were set forth verbatim.

TECHNICAL FIELD

This invention relates generally to shopping carts and is particularly concerned with shopping cart nesting arrangements.

BACKGROUND OF THE INVENTION

Traditional shopping carts have a pivoted child seat on the rear wall, which is pivoted away from the rear wall to use the seat. On nesting, the child seat is collapsed and the seat and rear wall are lifted by the front end of a cart nesting in from the rear. At the same time, the lower tray is also pivoted and is lifted by the lower end of the nesting cart. The various movable parts of such carts to permit nesting will tend to rattle as the cart travels, and also make nesting more difficult. Separating nested carts can also be a problem when these parts become stuck or jammed together.

U.S. Pat. No. 2,890,057 of Davis describes a conventional type of collapsing baby seat on a cart. Shopping carts are known which have different nesting arrangements, but these are subject to some other disadvantages. In my U.S. Pat. No. 6,126,181, a shopping cart with stepped, completely separate upper and lower baskets is described, in which the lower basket is offset forwardly from the upper basket, so that the lower basket of a rear cart can be nested under the upper basket of a forward cart for storage. The upper basket may include a child seat. However, the baskets are of reduced size and terminate short of the forward end of the cart. The base or lower tray is fixed and is stepped to permit nesting. In my U.S. Pat. No. 6,098,998, a shopping cart is described which has a child seat at the front end of the cart, and a pivoted rear wall for nesting. The lower tray or base is inclined downwardly from the rear to the front end of the cart to permit nesting without having to lift the lower tray, reducing moving parts.

SUMMARY OF THE INVENTION

It is an object of the present invention to provide a new and improved shopping cart with an improved nesting arrangement.

According to the present invention, a shopping cart is provided which comprises a wheeled base having a front end and a rear end, a rear frame projecting upwardly from the rear end of the base and having a handle at its upper end, a basket having a rear end secured to the frame and projecting forwardly from the frame at a spacing above the base, the basket having a front wall, spaced side walls, a lower wall, and an open rear end, a fixed child seat secured to the rear frame adjacent the upper end of the frame, and a rear gate pivoted below the child seat to close the open rear end of the basket, whereby two or more carts can be nested together by pushing the front wall of the basket of a first cart through the rear frame beneath the fixed child seat of a second cart, simultaneously pivoting the rear gate upwardly to allow the basket of the first cart to enter the basket of the second cart.

This invention provides a nestable cart with a fixed child seat at the rear end of the cart, close to the customer pushing the cart. In an exemplary embodiment of the invention, the side walls of the basket have a raised rear portion and a downwardly stepped front portion, and the child seat is secured between the raised rear portions of the side walls such that a base of the seat is spaced above the downwardly stepped front portion of the side walls and the seat extends forwardly from the rear frame. The basket may extend to the front end of the cart, so that the amount of storage space for items to be purchased is not reduced. The base of the cart may have a hinged lower platform for nesting, or may have a fixed platform which is inclined downwardly or stepped to permit nesting.

The upper rims of the front portion of the side walls may be inclined downwardly from the front end of the cart up to the upward step in the side walls between the front portions and the raised rear portions. This will permit large boxes and the like to be placed on top of the side walls adjacent the step, with the downward slant of the upper rims reducing the risk of such items sliding off the front end of the cart. A plastic molding or the like may be snapped over the upper rims in the case of a coated metal cart, and the front corners of the basket may be provided with plastic or rubber bumpers extending the full height of the basket. With this arrangement, when a rearward cart is nested into a forward cart, the bumpers at the front end of the rearward cart will rub against the moldings on the rims of the side walls of the forward cart, rather than the metal or coated metal side of the cart. This will help to protect any coating on the metal wire basket from damage.

A latch may be provided for latching the forward end of child seat of a rear cart to the rear end of the child seat of a forward cart into which the rear cart is nested. This will permit a row of nested carts to be easily secured together, such that they can be more easily transported from a parking lot to a store.

In an exemplary embodiment of the invention, the base of the cart comprises a generally U-shaped frame projecting forwardly from the rear frame and having an open rear end, the frame having inwardly tapered side walls for permitting nesting. A stepped tray may be secured to the frame, the tray having a series of downwardly stepped portions extending from the rear end to the front end of the base. These portions each provide a horizontal support surface for goods placed on the tray, while at the same time permitting nesting of the base of one cart into the rear end of the base of another cart. The base may incorporate removable caster lifts which engage over the frame so that the rear wheels of a forward cart are lifted slightly when a rear cart is nested into the forward cart. The removable "caster lift" design is a substantial improvement over permanent caster lifts that have been used in the past.

The shopping cart of this invention has a significantly reduced number of moving parts, only requiring a small, relatively light rear gate for nesting, and has a completely fixed child seat which is more stable and secure. A fixed child or baby seat has many advantages over traditional, collapsible child seat assemblies. The fixed baby seat does not rattle, is lighter, does not damage seat belts, provides an area for a full size cup holder, provides a much larger "small item" basket when not needed for a child or baby, and makes carts easier to nest and less likely to jam or become stuck together. This new cart design will require significantly less maintenance than traditional carts with moveable child seats.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 5 is a side view showing two carts nested;

FIG. 6 is an enlarged view, partially cut away, of the area 6 in FIG. 5, showing a latch for holding carts together;

FIG. 11 is a side elevation view of a shopping cart according to another embodiment of the invention;

FIG. 12 is a cross-sectional view of the upper rim of a side wall of the cart of FIG. 11, on an enlarged scale, taken on lines 12-12 of FIG. 11;

FIG. 13 is a front elevational view of the cart of FIG. 11;

DETAILED DESCRIPTION OF THE DRAWINGS

Figure 1:
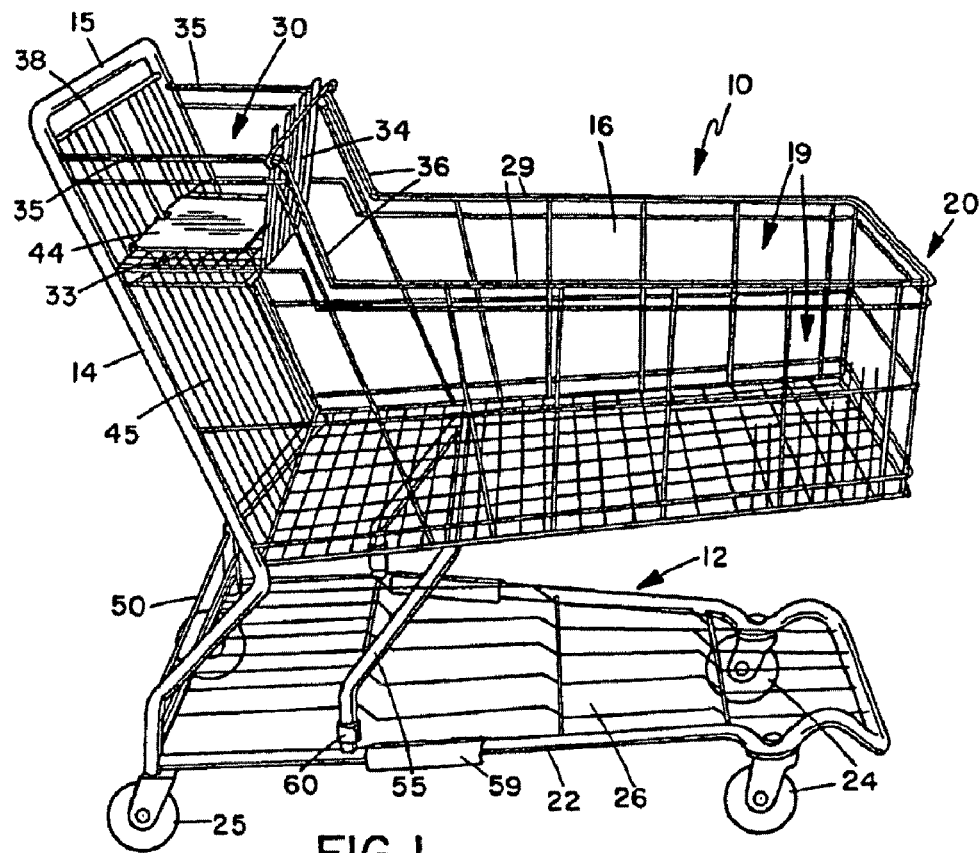
FIG. 1 is a perspective view of a shopping cart according to an exemplary embodiment of the invention.

The drawings illustrate a shopping cart 10 according to an exemplary embodiment of the present invention. As best illustrated in FIG. 1, the cart 10 basically comprises a wheeled base 12, a rear frame 14 projecting upwardly from the base 12 at the rear end of the cart and having a handle 15 at its upper end, and a basket 16 projecting forwardly from the rear frame at a location spaced above the base 12. Basket 16 has a lower wall 18, spaced side walls 19, and a front end wall 20, all of wire or plastic grille construction. Base 12 comprises a generally U-shaped frame 22 with side walls tapering outwardly from the front to the rear end of the cart, with the frame being open at its rear end, front caster wheels 24 and rear caster wheels 25, and a tray 26 welded to the frame to support items on the base of the cart.

Figure 2:
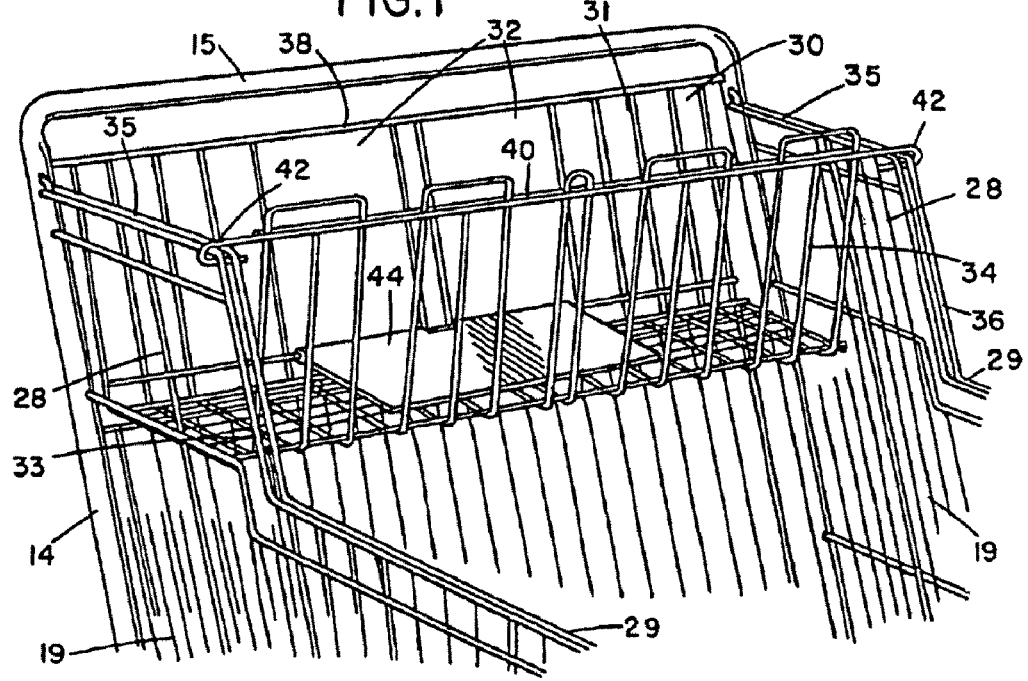
FIG. 2 is an enlarged perspective view of the upper portion of the cart, showing the seat structure.
Figure 3:
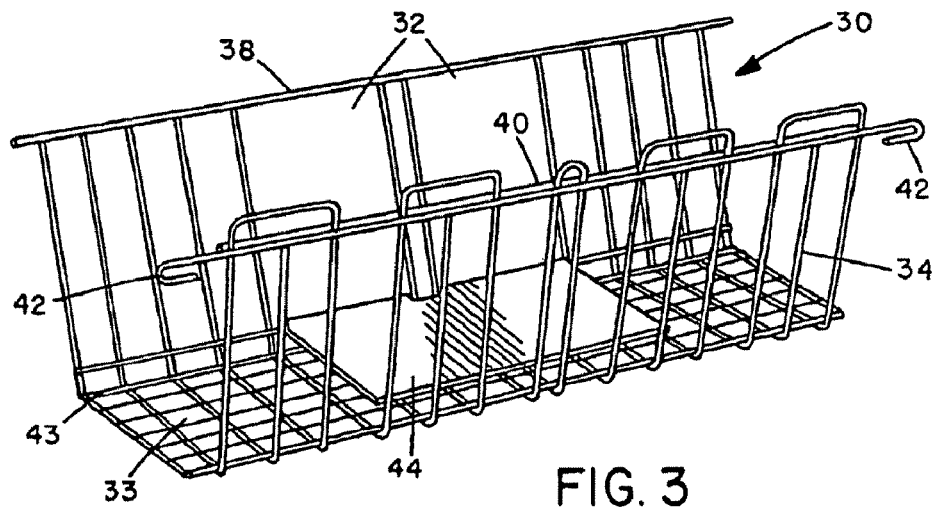
FIG. 3 is a perspective view of the seat frame.

Each side wall 19 has a raised rear end portion 28 and a downwardly stepped portion 29 projecting forwardly from the rear end portion to the front end wall 20. A fixed child or baby seat 30 is secured between the raised rear end portions 28 of the side walls at the rear end of the cart, as best illustrated in FIG. 2. The seat 30 has a rear wall 31 with leg openings 32, a base 33, and a front wall 34 (see FIGS. 2 and 3). The base is located above the downwardly stepped portions of the side walls, as can be seen in FIG. 1. The rear wall 31 may be secured by welding or the like between opposite sides of the rear frame 14 adjacent handle 15, as indicated. The front wall 34 may be secured by welding or like to the raised rim 35 of the opposite raised rear portions 28 of the side walls of the basket, adjacent the step 36 down to the downwardly stepped portion 29 of each side wall. In the illustrated embodiment, the rear wall of the seat has an upper rail 38 which has opposite ends welded to opposite sides of the rear frame 14 at a small spacing below handle 15, as best illustrated in FIG. 3, while the front wall 34 has an upper rail 40 with hooked ends 42 which are hooked or snapped over opposite portions of the upper rim 35 of the raised portion 28 of each side wall of the basket. The lower rail 43 of the rear wall may also be welded to opposite sides of the rear frame 14. In an alternative embodiment, the rear and front walls of the seat are both welded to opposing portions of the side walls at their upper and possibly also the lower corners. The child or baby seat has a conventional plastic flap 44 for supporting a child in the lowered position of FIGS. 2 and 3. This is pivoted to the rear wall so that it may be raised in a conventional manner to cover openings 32 when it is desired to use the child seat as an auxiliary basket for carrying small items.

The rear end of the main basket 16 is open beneath child seat 30, and a rear gate 45 of lightweight construction is pivoted to the lower rail 43 of the child seat so as to close the open rear end of the basket while in use. Rear gate 45 will be lifted inwardly and upwardly when another cart is nested in from the rear, as described below in connection with FIG. 5.

Figure 4:
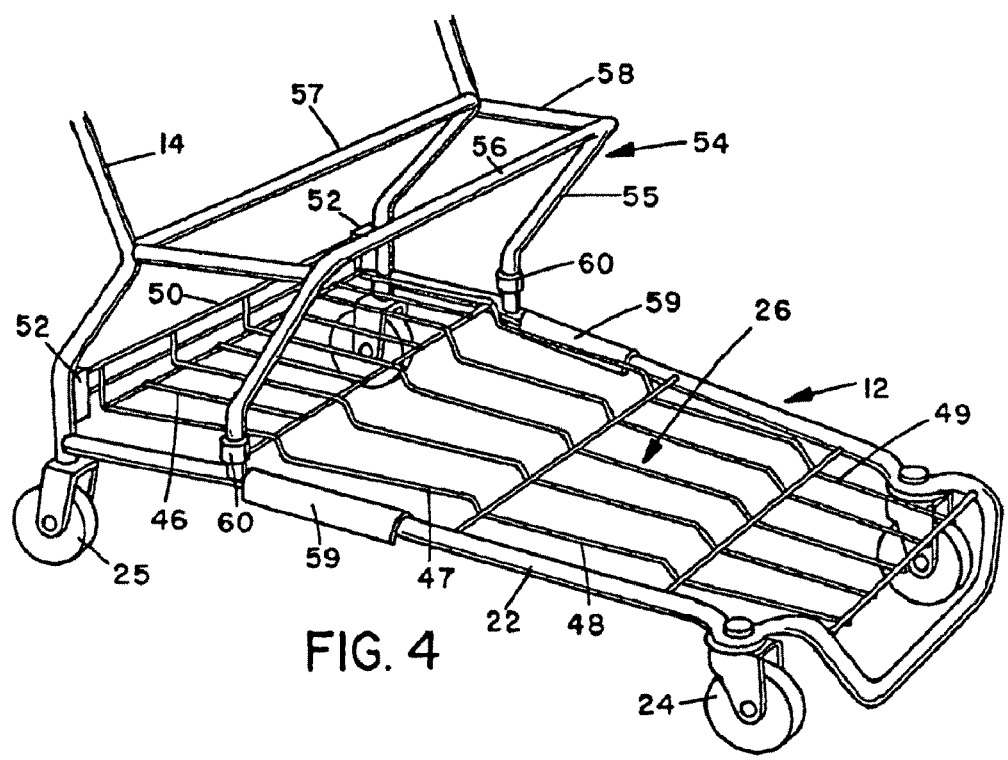
FIG. 4 is an enlarged perspective view of the lower portion of the cart.
Figure 7:
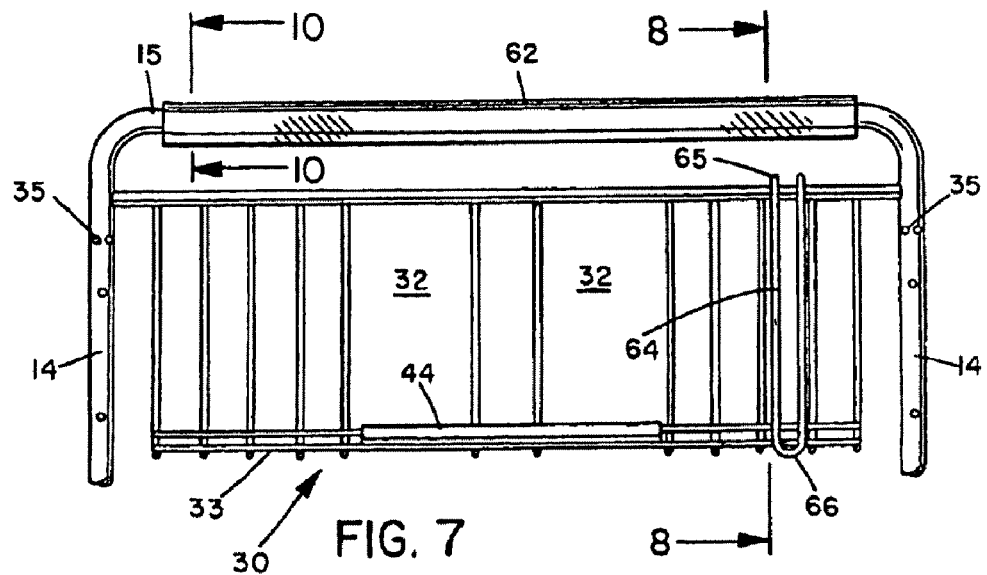
FIG. 7 is an enlarged sectional view taken on line 7-7 of FIG. 5, showing a retractable hanger in the retracted position.

Lower tray 26 is welded between opposite sides of the base frame 22 and has a series of four horizontal steps 46, 47, 48, 49 of progressively lower height between the rear end and the front end of the cart, as illustrated in FIGS. 1 and 4. The rearmost step 46 has a raised rear rim 50 which is welded between opposite sides of rear frame 14, as best illustrated in FIG. 4. A pair of caster lift members 52 are removably mounted on rim 50 adjacent the opposite sides of frame 14, so as to project downwardly from the rim a short distance. In one embodiment, the caster lift members 52 are downwardly projecting blocks. Although four horizontal steps are illustrated, the tray 26 may have only two or three steps, or any number of steps, in alternative embodiments. In other embodiments, the lower tray may be eliminated, so that the base comprises only the lower, u-shaped frame. In this case, a separate piece may be welded between the opposite sides of the rear frame, in place of rim 50, to mount the caster lift members 52.

As illustrated in FIG. 4, an additional support frame is provided for the lower wall of the basket, spaced forwardly from rear frame 14. The additional support frame comprises a U-shaped frame member having bars 55 projecting upwardly from opposite sides of the base frame 22, with a cross bar 56 at its upper end, a second cross bar 57 between opposite sides of the rear frame 14 aligned with cross bar 56, and connecting bars 58 between the ends of cross bars 56 and 57, forming a square frame support for the basket. A first sleeve 59 is snapped over each side of base frame 22 in front of the respective bar 55, and a second sleeve 60 is snapped over the lower portion of each bar 55, as indicated in FIG. 5. These are for smooth sliding and protection of the frame on nesting, as discussed in more detail below, and are of plastic or other suitable smooth material.

Figures 8, 9:
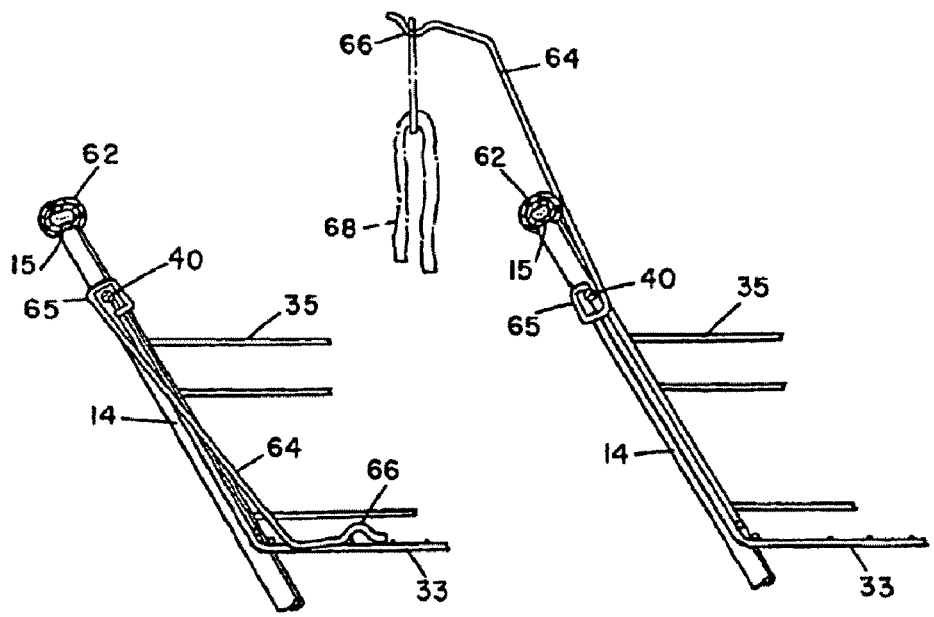
FIG. 8 is a sectional view taken on line 8-8 of FIG. 7.
FIG. 9 is a view similar to FIG. 8, but with the hanger in an extended position.
Figure 10:
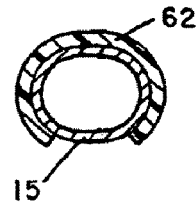
FIG. 10 is an enlarged sectional view taken on line 10-10 of FIG. 7.

In an exemplary embodiment of the invention, a sleeve or cover 62 of plastic or the like is also snapped over handle 15, as best illustrated in FIGS. 7 to 10. The handle may be flattened as indicated in FIG. 10 to resist rotation of the round sleeve 62. The store name may be printed on the flattened portion of the handle 15, or on an inner or outer surface of sleeve 62. FIGS. 8 and 9 illustrate an optional carrying hook 64 which may be secured to the upper rail 38 of child seat 30, as indicated or to the handle 15 or to a mount below the handle. The hook 64 is shown in a stored position in FIG. 8, and in a deployed position in FIG. 9. The hook has an end loop or ring 65 looped over the rail 38, and in the position of FIG. 8 it hangs down against the rear wall 31 of the child or baby seat, with the bent, hooked end 66 lying on the base 33 of the seat. If a customer wants to use the hook to hang items on hangers, or a bag, from the rear of the cart, they simply rotate it upwardly into the deployed position of FIG. 9, when an item such as a bag 68 or hanger carrying clothing can be suspended from it, leaving more room in the cart. Filled bags of groceries, or other bags, may also be hung from the hooked end 66 of the hook 64. This type of hook could not be used with the traditional collapsible baby seat assembly.

Nesting of two or more carts to conserve space when the carts are not in use will now be described with reference to FIGS. 5 and 6. FIG. 5 illustrates two carts nested together. The rear cart is pushed into the rear end of the forward cart, so that the front end wall 20 of the rear cart basket pushes up the rear gate 45 of the front cart basket, and the rear cart basket slides into the front cart basket under the front cart seat 30. At the same time, the front end of the wheeled base 12 of the rear basket will enter the space beneath the rear end of the tray of the front basket. As the rear cart continues to travel inwards, the first sleeves 59 on opposite sides of the lower frame will engage under the respective caster lift members 52 at the rear end of the tray of the forward cart.

Both the sleeves and the lift members can be made of materials such as plastic that will help the lower frame to slide smoothly into the fully nested position. When fully nested, the second sleeves 60 may engage the rear end of the tray of the forward cart, reducing any risk of damage. At the same time, the engagement between the first sleeves and caster lift members will lift the rear end of the forward cart slightly, so that its rear wheels 25 are raised slightly off the ground, as indicated in FIG. 5. When a plurality of carts are nested together in a line, only the cart front swivel wheels and the rear wheels of the rearmost cart will touch the ground, making steering of the line of carts back to a store much easier. The caster lift effect may be provided with only the members 52 or sleeves 59, if desired, and 60 is not essential. Additionally, when the caster lift members 52 are of a low friction material such as Teflon®, the sleeves 59 may be eliminated, since the smooth, low friction material of members 52 will ensure a smooth sliding engagement with the base of the nesting cart, with substantially no risk of damage to the powder coating.

Nested carts may also be latched together as indicated in FIG. 6. Each cart may have a latch 70 mounted on the upper rail 40 of the front wall of baby seat 30, which engages or snaps over the upper rail 38 of the rear wall of the baby seat of the cart in front when two carts are nested together, as indicated in FIG. 6. This means that all carts in a nested line of carts can be latched together. This is particularly useful where the rear wheels of all of the nested carts except the rear one are lifted off the ground, in the manner described above. This makes the row of carts much easier to maneuver. The latch is constructed with a ramp 72 so the latch lifts and engages automatically when the carts are nested (see FIG. 6). The carts can easily be unlatched by the customer (or someone else) depressing release member 74 when the carts are to be separated. The vertical arm of release member 74 will hold the latch in a horizontal orientation after release. This system will not work with the traditional collapsible baby seat.

FIGS. 11 to 15 illustrate a shopping cart 100 according to another embodiment of the invention. Some parts of the cart 100 are identical to the previous embodiments, and like reference numerals have been used for like parts as appropriate. As in the first embodiment, cart 100 has a wheeled base 12, a rear frame 14 projecting upwardly from the rear end of the base and having a handle 15 at its upper end, and a basket 16 projecting forwardly from the rear frame at a location spaced above the base.

Basket 16 is of wire grille construction with a lower wall 18, spaced side walls 119, and a front end wall 20. As in the previous embodiments, the side walls 119 each have a raised rear end portion 28 between which a fixed baby seat 30 is secured and a downward step 36 at the forward end 34 of the baby or child seat 30. In this embodiment the upper rims 120 of the downwardly stepped forward end portions of the side walls are inclined upwardly from the step 36 up to the forward end of the cart, such that the height at the forward end of the cart is about one inch higher than at the bottom of the step 36. The upward angle of the rims is of the order of 2° to 3°. This is different from the previous embodiments, where the forward end portions 29 of the side walls 19 have a slight downward incline towards the front end of the cart (see FIG. 5).

Figure 14:
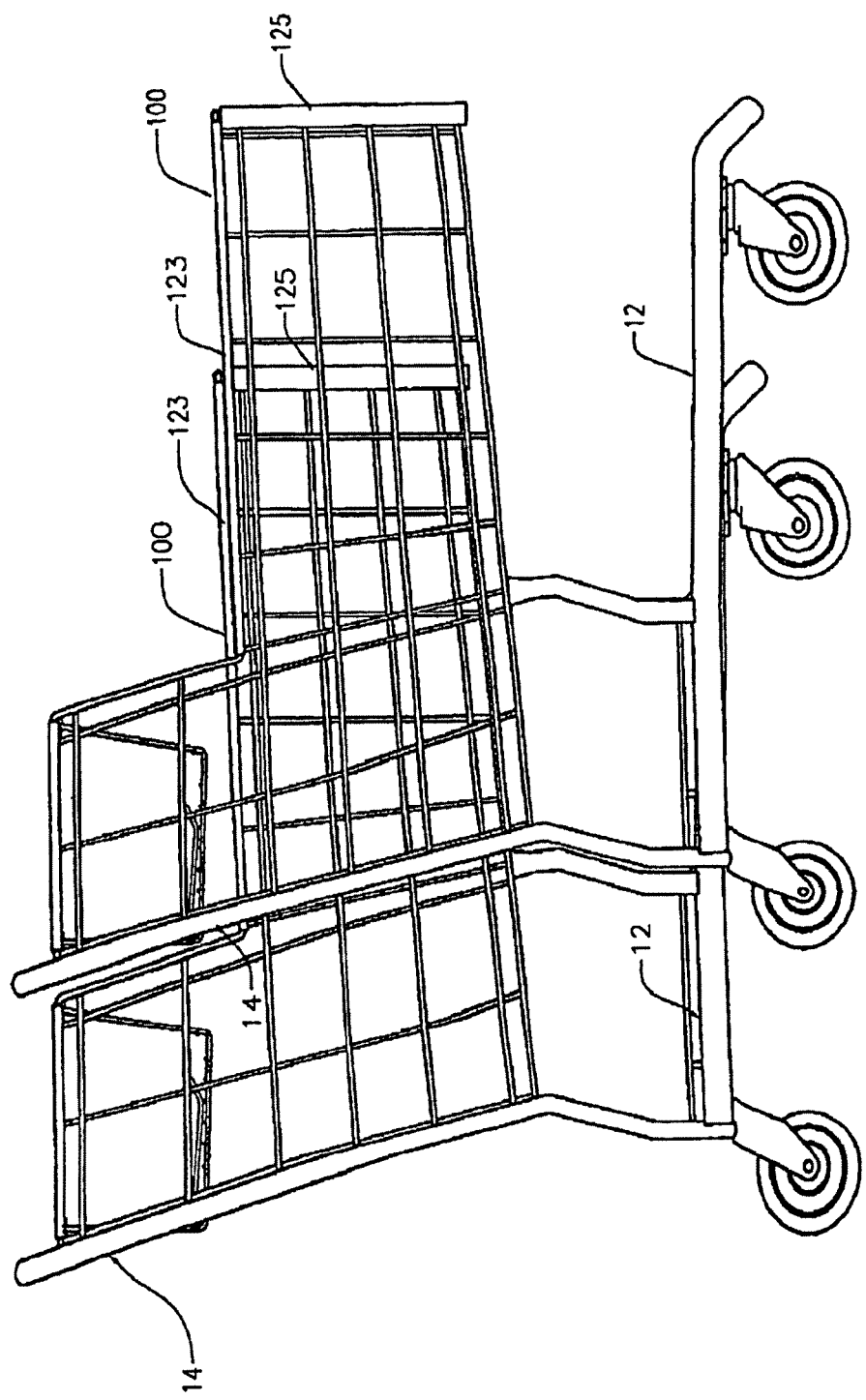
FIG. 14 is a side elevation view of two of the carts of FIG. 11 nested together for storage.

As in the previous embodiments, the cart 100 is designed for nesting, and the rear end of the basket is open beneath the child seat 30, with a rear gate pivoted to the lower rail of the child seat. Gate 45 is lifted inwardly and upwardly when another cart is nested in from the rear. The base 12 comprises a generally U-shaped frame with an open rear end and side walls which taper inwardly from the rear end to the front end of the cart, and may have a stepped tray 26 as in the first embodiment. This arrangement permits a rearward cart to be nested into the rear end of a forward cart, as illustrated in FIG. 14, with the base of the rearward cart nesting under the base of the cart in front, and the basket of the rearward cart pushing up the gate 45 and nesting into the basket of the forward cart.

The basket in this embodiment, as in the previous embodiment, has a double wire 121,122 (best seen in FIG. 12) extending around the upper rim of the side walls and front end wall. In this case, a generally C-shaped molding 123 of plastic or the like is snapped over the double wire rim of the side and front end walls, substantially as described in my U.S. Pat. No. 5,106,111, the contents of which are incorporated herein by reference. C-shaped molding 123 is provided on the upper rim of the raised portion 28 of each side wall, as well as on the inclined upper rim of the forward end portion of each side wall, but not on step 36. Additionally, the front corners of the wire basket are covered by full length corner bumpers 125 of rubber or plastic. The bumpers 125 and moldings 123 help to reduce the risk of damage to the carts during nesting. Shopping carts are often made of powder coated metal, and nesting of such carts can result in scratching or other damage to the coating, where part of one cart rubs against another cart. In this case, when the basket of the rearward cart is pushed into the forward cart, the front bumpers of the rearward cart will rub against the top moldings 123 of the side walls of the forward cart, rather than the front metal corners or bumpers rubbing against the side walls. This protects the coating of the basket side walls. The upward taper of the upper rims of the side walls also helps to reduce the contact between the basket side walls of the nested carts. As can be seen in FIG. 14, the nested portion of the rearward basket will have the upper rims of its side walls raised above the upper rims of the side walls of the forward basket, reducing contact between these parts, while the front corner bumpers will rub against the top moldings 123, protecting the cart coating from damage.

Figure 15:
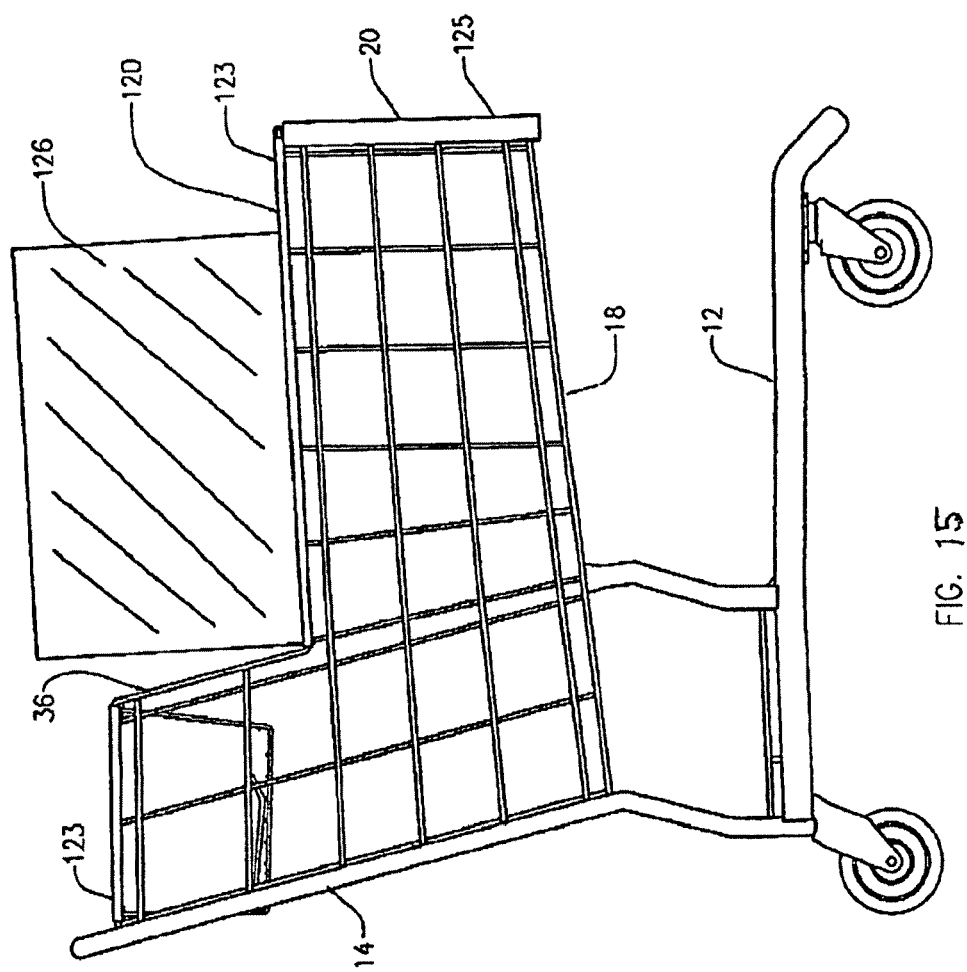
FIG. 15 is a side elevation view of the cart of FIG. 11 supporting a box.

The upwardly inclined side walls forward of the step 26 have the added advantage of permitting items which are too large to place inside the basket to rest on top of the side walls. As illustrated in FIG. 15, a box 126 or similar large item may be placed on top of the side walls adjacent step 36. Due to the upward taper of the side walls, the box will be unlikely to slip forwards during transportation, unlike carts with downwardly inclined basket side walls.

Figure 16:
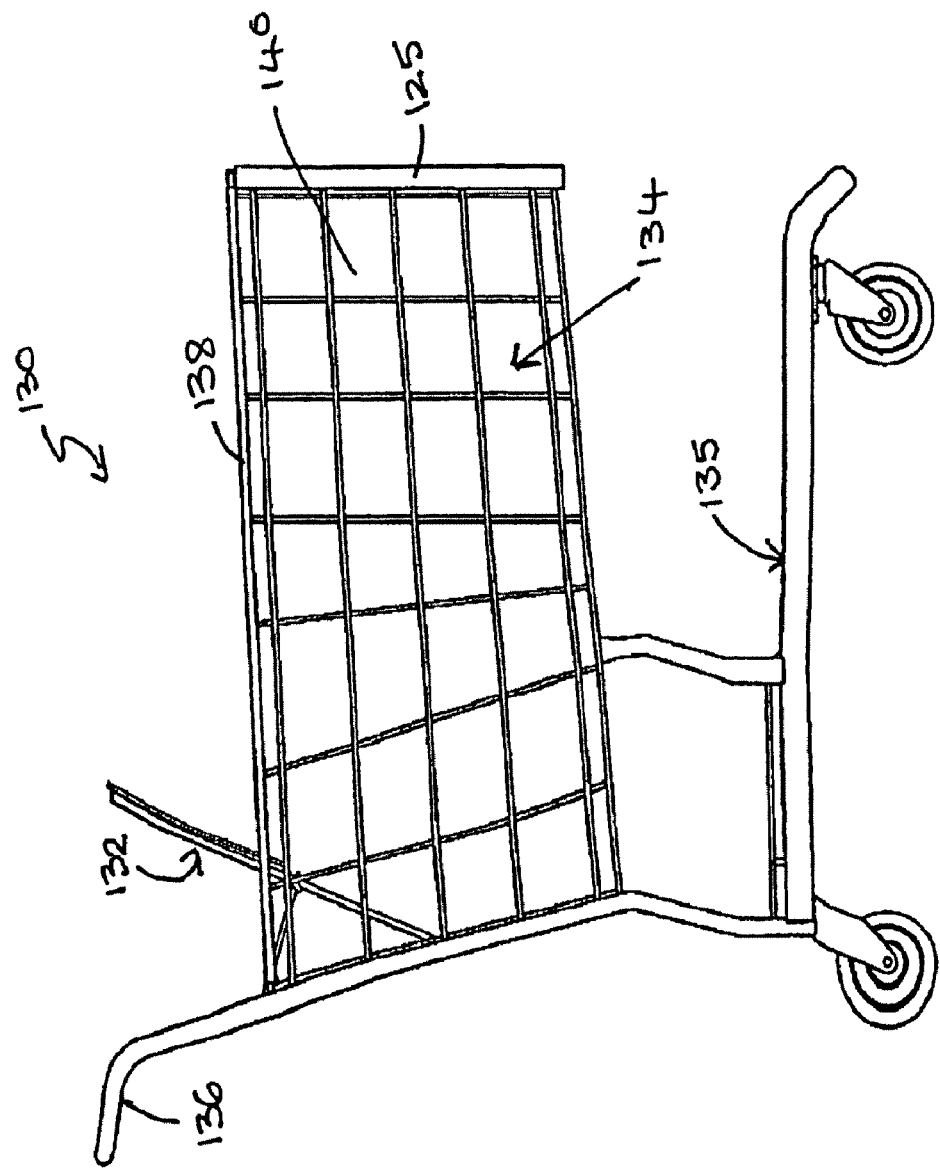
FIG. 16 is a side elevation view of a shopping cart according to another embodiment of the invention having a conventional collapsible child seat.
Figure 17:
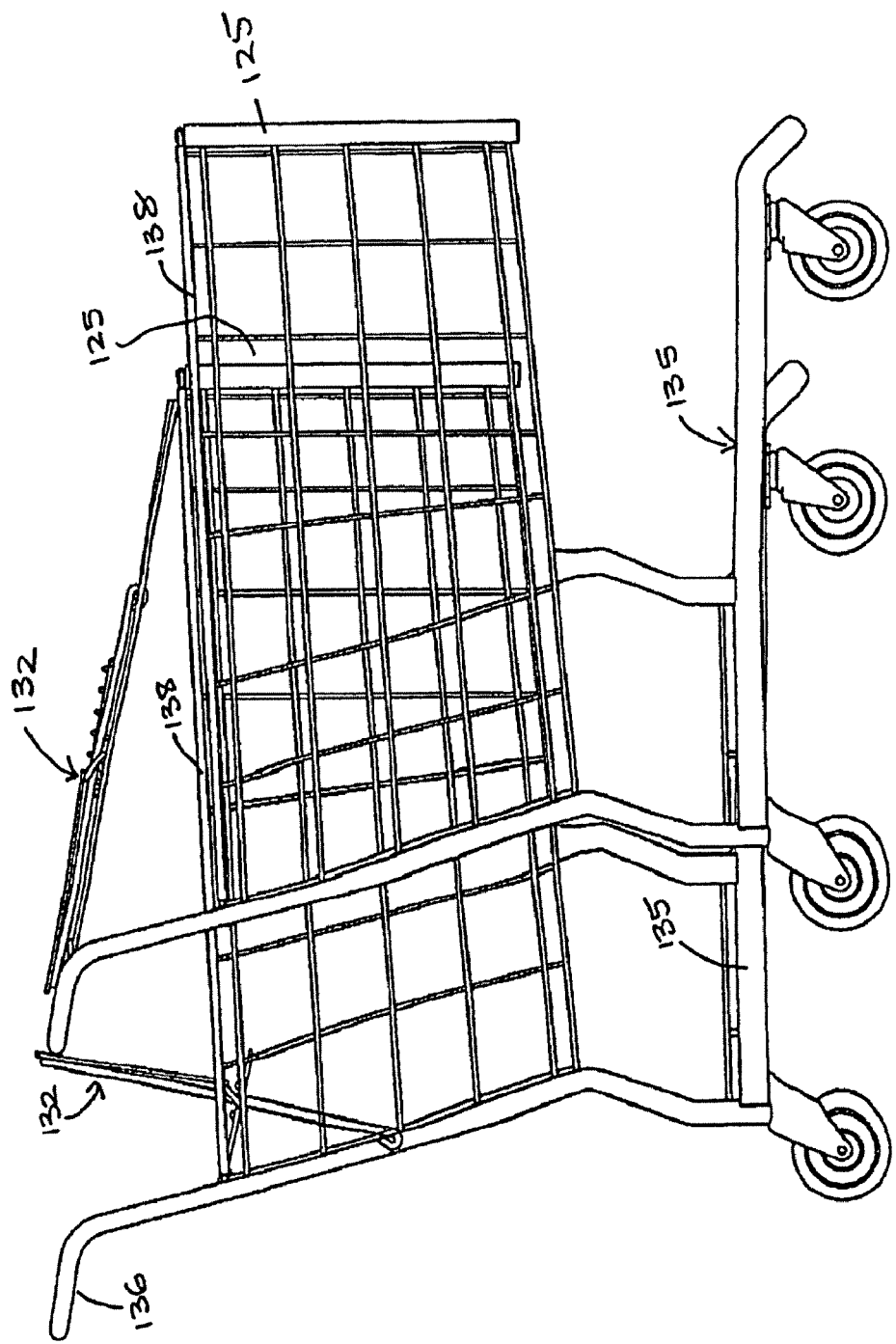
FIG. 17 is a side elevation view of two of the carts of FIG. 16 nested for storage.
Figure 18:
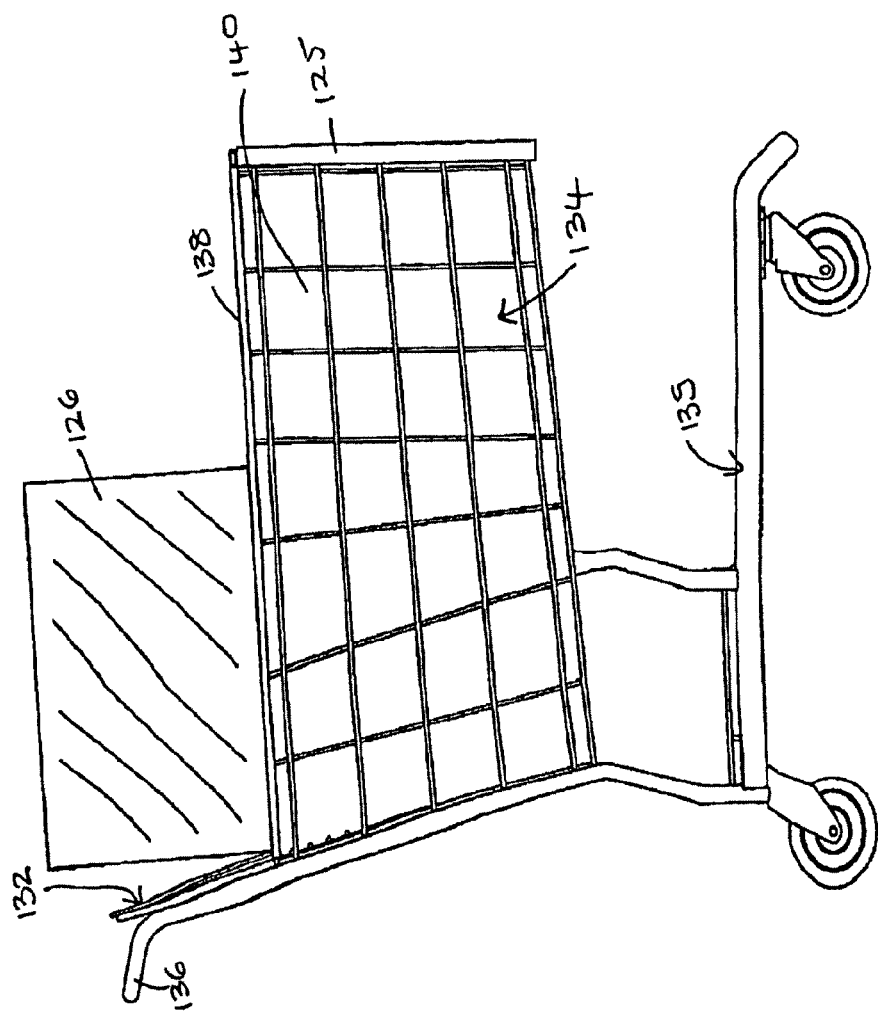
FIG. 18 is a side elevation view of the cart of FIG. 16 supporting a box.

FIGS. 16 to 18 illustrate a shopping cart 130 according to another embodiment of the invention which has a more conventional collapsible child seat 132 at the rear end of the basket 134. The cart 130 has a wheeled based 135 and a handle frame 136 at the rear end of the basket. As in the previous embodiment, front bumpers 125 are provided at the front corners of the basket. A C-shaped cover or molding 138 is snapped over the double wire rim of each side wall 140 of the basket, and a similar C-shaped molding (not visible in drawing) is snapped over the upper rim of the front wall 142 of the basket. In this embodiment, the upper rim of each side wall 140 is inclined upwardly for the entire length of the basket, from the rear end 144 to the front end wall. The upward inclination may be of the order of 2 to 4. Again, this provides users with the option of placing larger items such as large boxes 126 on top of the side walls, with the upward inclination of the side walls reducing the risk of such items sliding off the front end during transportation, as illustrated in FIG. 18. However, in this case, the child seat 132 is collapsed against the rear frame when large boxes are carried. This cart can also be nested in a similar manner to the previous embodiments, as indicated in FIG. 17 with the rear gate and collapsed child seat 132 of the forward cart lifting upwardly to allow a rearward cart to be nested into a forward cart. It will therefore have the same advantage of reducing the risk of damage to a powder coating on a cart during nesting, since the front bumpers of a rearward cart will rub against the plastic or rubber side rim moldings 138 during nesting, preventing the coated metal portions of the carts from rubbing against one another.

The shopping cart of this invention has many advantages over more traditional carts. This cart has a fixed baby seat and a fixed lower tray, avoiding the need to have a liftable and collapsible baby seat, and a liftable lower tray. Having fewer mobile parts is advantageous since it reduces rattling when the cart is in use, and makes carts lighter, easier to nest, less liable to jam together when nested, and will require significantly less maintenance. In the illustrated embodiments, the baby seat is secured between raised side portions of the basket side walls. However, it will be understood that the basket may have side walls of uniform height in alternative embodiments, and the baby seat may be simply welded to the rear frame of the cart to project forwardly from the rear frame above the basket.

Another advantage of having fewer moving parts is that it will reduce wear in carts which are powder coated rather than chrome plated. By providing forward corner bumpers and upper moldings on the upper rims of the basket, as in the embodiments of FIGS. 11 to 15 and FIGS. 16 to 18, the risk of damage to the powder coating during nesting is reduced or eliminated, since the bumper of a rearward cart will run or rub against the upper rim molding of the forward cart basket, preventing contact between the metal coated portions of the baskets. The fixed baby seat also provides a much larger "small item" basket, is less liable to cause damage to seat belts in the baby seat for holding a child in place, and also allows carts to be latched together when nested, as indicated in FIG. 6, making transportation of a line of nested carts from one place to another much easier. The upwardly inclined forward portions of the side walls in FIGS. 11 to 15 allow larger items to be safely placed on top of the side walls against the step, providing more versatility.

The cart may also have a removably mounted caster lift arrangement. This may comprise the removable plastic sleeves 59 on the lower frame and the caster lift member 52 at the rear end of the lower tray, both of which are designed to be snapped onto the cart. Traditional "caster lifts" involve welded-in components and are permanent. Sliding plastic on plastic or other suitable material is much smoother than the traditional steel on steel. Also, if the plastic parts wear they can be easily replaced, and they can be removed altogether if a caster lift is not desired.

Although some exemplary embodiments of the invention have been described above by way of example only, it will be understood by those skilled in the field that modifications may be made to the disclosed embodiments without departing from the scope of the invention, which is defined by the appended claims.

What is claimed is:

1. A nestable shopping cart, comprising:
   a wheeled base having a front end and a rear end, the base having an opening at the rear end to allow nesting of the base of a second, identical cart into the rear end of said wheeled base;
   a rear frame projecting upwardly from the rear end of the base and having a handle at its upper end;
   a basket having a rear end secured to the rear frame and projecting forwardly from the rear frame at a spacing above the base, the rear end of the basket having a one piece pivoted rear gate to allow nesting of the basket of a second cart into the rear end of the basket, and the basket also having spaced side walls wherein each side wall has a first portion extending from the rear end of the basket and having a forward end, a downward step extending downwardly from the forward end of the first portion, and a second portion extending from the downward step to the front wall, the first portion having a height greater than the second portion;
   the base of the cart having a pair of side rails, a pair of rear wheels and a pair of front wheels; and
   at least one caster lift member mounted on the cart at a location for engagement with an opposing surface of a second cart during nesting of two carts, whereby the rear wheels of a front one of the two carts are lifted from the ground as the carts are nested together, wherein a pair of first caster lift members are downwardly projecting blocks removably mounted on the rear frame adjacent opposite sides of said base, whereby the first pair of the caster lift members of a forward cart will engage the said side rails of the base of a rear cart to lift the rear wheels of the forward cart when the two carts are nested together.

2. The cart as claimed in claim 1, wherein a pair of second caster lift members are removably mounted on said opposite side rails at a predetermined position for engagement with said first caster lift members of a forward cart when two carts are nested together.

3. The cart as claimed in claim 2, wherein said second caster lift members comprise slit sleeves.

4. The cart as claimed in claim 2, wherein said caster lift members are of plastic material.

5. The cart as claimed in claim 1, wherein said rails are inclined downwardly at said predetermined position.

6. A shopping cart, comprising:
   a wheeled base;

a rear frame projecting upwardly from the wheeled base and;

a basket secured to the frame and having a rear end, a front wall and spaced side walls;

each side wall having a first portion extending from the rear end of the basket and having a forward end, a downward step extending downwardly from the forward end of the first portion, and a second portion extending from the downward step to the front wall, the first portion having a height greater than the second portion; and at least one caster lift member mounted on the base.

7. The shopping cart of claim 6, wherein the second portion of each side wall has an upper rim which is inclined upwardly from the downward step to the front wall, whereby the downward step and the upwardly inclined rims together form a ledge for supporting an item of larger dimensions than the basket on said rims adjacent said step.

8. The shopping cart of claim 6, wherein the at least one caster lift member is a downwardly projecting block.

9. The shopping cart of claim 8, wherein the wheeled base further comprises a rear rim connected to the rear frame, the shopping cart further comprising a pair of caster lift members attached to the rear rim.

10. The shopping cart of claim 6, wherein the basket further comprises a pivoted rear gate to allow nesting of the basket of a second cart into the rear end of the basket.

11. A nestable shopping cart, comprising:

a wheeled base having a front end and a rear end, the base having a pair of rear wheels, a pair of front wheels, and an opening at the rear end to allow nesting of the base of a second, identical cart into the rear end of said wheeled base;

a rear frame projecting upwardly from the rear end of the base and having a handle;

a basket having a rear end secured to the rear frame and projecting forwardly from the rear frame at a spacing above the base, spaced side walls, and a front wall, the rear end of the basket having a one piece pivoted rear gate to allow nesting of the basket of a second cart into the rear end of the basket, each side wall having an upper rim which is inclined upwardly from the rear end to the front wall of the basket; and a child seat projecting forwardly from the rear frame.

12. The shopping cart of claim 6, further comprising a child seat projecting forwardly from the rear frame.

13. The shopping cart of claim 11, further comprising at least one caster lift member mounted on the wheeled base.

\* \* \* \* \*